No. 685,495. Patented Oct. 29, 1901.
A. D. STRONG.
WATER RAISING AND DISTRIBUTING SYSTEM.
(Application filed Apr. 4, 1900.)
(No Model.)
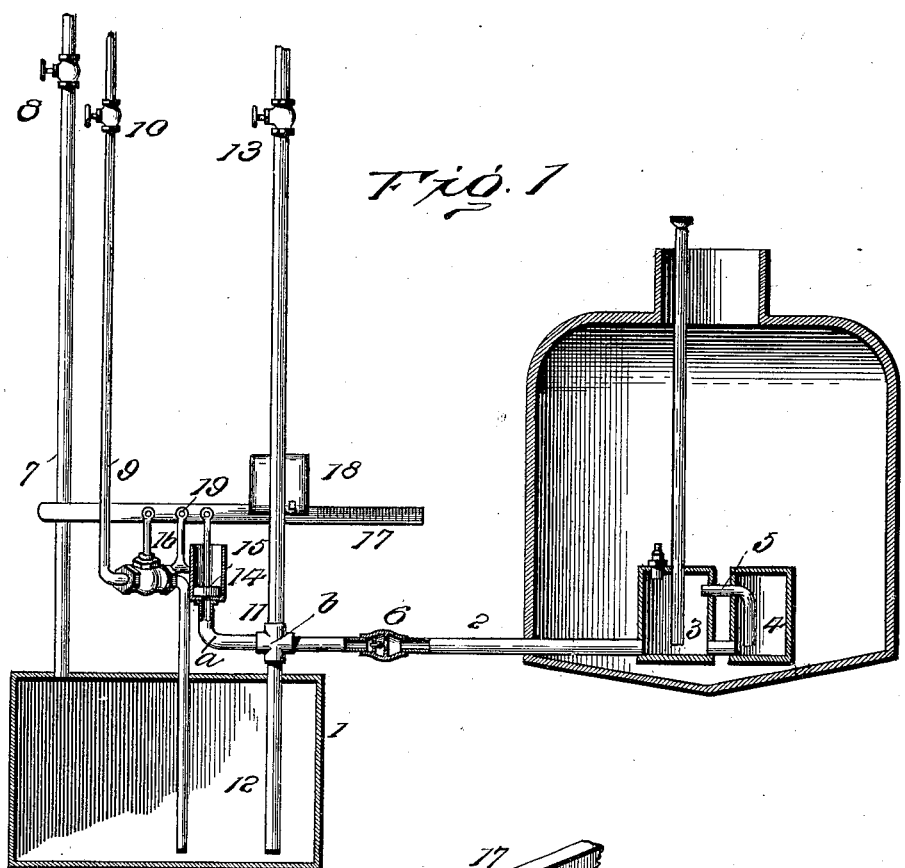
Witnesses
Gladys L. Thompson
Inventor
Abner D. Strong
By Lacey, his Attorneys

UNITED STATES PATENT OFFICE.

ABNER D. STRONG, OF ASHTABULA, OHIO.

WATER RAISING AND DISTRIBUTING SYSTEM.

SPECIFICATION forming part of Letters Patent No. 685,495, dated October 29, 1901.

Application filed April 4, 1900. Serial No. 11,529. (No model.)

*To all whom it may concern:*

Be it known that I, ABNER D. STRONG, a citizen of the United States, residing at Ashtabula, in the county of Ashtabula and State of Ohio, have invented certain new and useful Improvements in Water Raising and Distributing Systems; and I do hereby declare the following to be a full, clear, and exact description of the invention, such as will enable others skilled in the art to which it appertains to make and use the same.

This invention has relation to apparatus for elevating and distributing water, the purpose being to secure a responsive action, maintain the water under a predetermined pressure, and insure positiveness of operation, the workings being automatic and self-regulable after the cistern or tank is charged until emptied.

Other advantages than those enumerated will suggest themselves to those versed in the art of water-distributing systems as the nature of the invention is comprehended.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment thereof is illustrated in the accompanying drawings, in which—

Figure 1 is a detail view showing the application of the invention. Fig. 2 is a detail view of the regulating-valve.

The same parts are indicated in the views of the drawings by like reference characters, which are also employed in the description to designate the structural elements when making reference thereto.

The water to be elevated and distributed is contained in a tank, cistern, or reservoir 1, which is of desired capacity and located at a lower level than the source of water-supply. Inasmuch as the cistern aims to supply filtered water for domestic purposes, the supply-pipe 2 connects with a series of filters 3 and 4, connected by means of a pipe 5. A check-valve 6 is located in the length of the supply-pipe 2 and prevents any water passing from the tank 1 back through the pipe 2, but opens automatically to admit of water passing from the filter 3 through the pipe 2 into the tank 1.

The tank or cistern 1 is air-tight, and an outlet-pipe 7 communicates with the top thereof and is provided with a valve 8. A pressure-supplying pipe 9 extends through the top of the tank and terminates within a short distance of the bottom thereof and is provided with a valve 10. This pipe connects with a compressed-air reservoir or means for supplying air to the tank under pressure. The service-pipe 11 connects with a pipe 12, located within the tank and having its lower end extending to within a short distance of the bottom of said tank, and is provided with a valve 13. The pipe 12 is common to the service-pipe 11 and supply-pipe 2. In this connection it is to be understood that the pipe 11 conveys water to any suitable point of discharge, as commonly practiced in fitting a house with water-fixtures. The means for regulating the pressure consists of a cylinder 14, a piston 15, working therein, a valve 16, and a lever 17, provided with a shiftable weight 18, said lever being graduated and mounted upon a standard 19, intermediate of the connection therewith of the rods of the piston 15 and valve 16. The piston 15 has a greater superficial area than the valve 16 and exerts a pressure upon the water contained in the tank 1. By adjusting the weight 18 upon the lever or scale-beam 17 the pressure required for operating the piston can be varied. When the piston is moved upward, the valve 16 is closed and shuts off the pressure-supply to the tank, and when the piston 15 moves inward under the influence of the weight 18 the valve 16 is opened and communication established between the tank 1 and the means for supplying air under pressure thereto. When the pressure within the tank reaches the required point, it reacts upon the piston 15 and moves it outward and effects a closing of the valve 16; but when the pressure within the tank falls below a given point, as when opening the valve 13 or any outlet in connection with the service-pipe 11, the piston 15 will move inward by the superior pressure of the weight 18 and cause an unseating of the valve 16 and admit air under pressure into the tank to take the place of the diminished pressure. When the required pressure within the tank is reached, the piston 15 will again move outward and close the valve 16, as will be readily comprehended. The pipe *a*, connecting the cylinder 14 with the cluster *b*, and the pipes 11, 12, and 2 radiate from a common point, which is the cluster *b*, thereby producing an exceedingly simple construction and compact arrangement and reducing the number of connections. The piston 15 is directly influenced by the change of pressure in the pipe 11, and the valve 16 is made more responsive. The pipe 7 being separate and independent of any other pipe enables the tank 1 to be vented at any time and for any purpose without requiring the shutting off of the pressure from the tank.

When it is required to charge the tank 1, the valve 8 is opened, the valve 13 closed, and the valve 10 operated to shut off the supply of air under pressure. Water will now pass into the tank through the pipes 2 and 12, and when said tank is filled the valve 8 is closed and the valve 10 opened, thereby permitting air under pressure to enter the tank 1. Upon opening any outlet in the service-pipe the action hereinbefore described will take place and is entirely automatic until the tank is emptied and requires replenishing.

While the system is primarily intended to elevate water for domestic use, watering stock, and irrigating purposes, it is to be understood that it can be used for raising cider, sewage, and any liquid. The tank may be submerged or elevated and may be of metal, wood, a combination of the two, cement, or masonry, as desired. The pipe 2 may extend to any source of water or liquid supply to be elevated.

Having thus described the invention, what is claimed as new is—

1. In a system for elevating and distributing liquids, a closed tank, a pipe for supplying liquid to the tank, a distributing-pipe in communication with the tank and supply-pipe, a regulator affected by the variation of pressure within the distributing-pipe and consisting of a cylinder connected therewith and a piston working in the said cylinder, a pressure-supplying pipe connected directly with the tank, and a valve in the length of the pressure-supplying pipe and having its stem connected with the piston-rod and actuated thereby, substantially as described.

2. In a system for elevating and distributing liquids, a closed tank, a cluster, a pipe connecting a branch of the cluster with the tank, a supply-pipe connected with another branch of the cluster and having a check-valve in its length, a distributing-pipe connected with the said cluster, a cylinder coupled to the cluster, a piston working in the cylinder, a pressure-supplying pipe in communication with the tank, and a valve in the length of the pressure-supplying pipe and connected with the piston to be actuated thereby, substantially as specified.

In testimony whereof I affix my signature in presence of two witnesses.

ABNER D. STRONG. [L. S.]

Witnesses:
H. C. HOLCOMB,
H. C. MEDDAUGH.